United States Patent [19]

Barbara et al.

[11] Patent Number: 5,553,284
[45] Date of Patent: Sep. 3, 1996

[54] METHOD FOR INDEXING AND SEARCHING HANDWRITTEN DOCUMENTS IN A DATABASE

[75] Inventors: Daniel Barbara, Princeton; Walid Aref, Monmouth Junction, both of N.J.

[73] Assignee: Panasonic Technologies, Inc., Princeton, N.J.

[21] Appl. No.: 469,803

[22] Filed: Jun. 6, 1995

Related U.S. Application Data

[63] Continuation of Ser. No. 248,392, May 24, 1994, abandoned.

[51] Int. Cl.$^6$ .................................................. G06F 17/30
[52] U.S. Cl. ................. 395/600; 364/283.1; 364/931.51; 364/963.5; 364/419.19
[58] Field of Search .................................. 345/600, 575, 345/700; 382/36, 21, 48

[56] References Cited

U.S. PATENT DOCUMENTS 3,588,823  6/1971  Chow.

(List continued on next page.)

OTHER PUBLICATIONS

Daniel P. Lopresti et al., "Approximate Matching of Hand-Drawn Pictograms", *Pre-Proceedings IWFHR III, Third International Workshop on Frontiers in Handwriting Recognition*, pp. 102–111 (May 25–27, 1993).

C. B. Bose, et al, "Connected and Degraded Text Recognition Using Hidden Markov Model", *IEEE*, pp. 116–119 (1992).

C. C. Tappert, et al, "The State of the Art in On–Line Handwriting Recognition", *IEEE Transactions on Pattern Analysis and Machine Intelligence*, vol. 12, No. 8, pp. 787–808 (Aug. 1990).

D. P. Lopresti et al, "Pictographic Naming", *Interchi '93 Adjunct Proceedings*, Conference on Human Factors in Computing Systems, pp. 77–78 (Apr. 27, 1993).

S. V. Vrbsky, et al, "Approximate—A Query Processor that Produces Monotonically Improving Approximate Answers", *IEEE Transactions on Knowledge and Data Engineering*, vol. 5, No. 6, pp. 1056–1068 (Dec. 1993).

M. M. Zloof, "Query–by–Example: a data base language", pp. 324–343.

Mou–Yen Chen, "Off–Line Handwritten Word Recognition Using Single Contextual Hidden Markhov Model" IEEE, 1992, pp. 669–672.

Junji Yamato, "Recognition Human Action in Time—Sequential Image using HMM", IEEE, 1992, pp. 379–385.

Amlan Kundu, "Recognition of handwritten script: A HMM base approach", IEEE, 1988, pp. 928–931.

J. A. Vlontzos, "A Hierarchichal System for Character Recognition", IEEE, 1989, pp. 1–4.

*Primary Examiner*—Thomas G. Black
*Assistant Examiner*—C. Pham
*Attorney, Agent, or Firm*—Ratner & Prestia

[57] ABSTRACT

A method for indexing electronic handwritten documents is provided. Each document includes a plurality of output symbols in an output sequence, and is modeled by a respective Hidden Markov Model (HMM). The HMMs share a common alphabet and a common sequence length. A tree is established, having linked nodes stored in a memory. Each node has n pointers, each identifying a different node in the next level of the tree. Each path from the root to a different one of the leaf nodes defines a respective sequence of pointers. An indexing procedure is performed, for each of a subset of the nodes in one of the levels of the tree. The procedure includes: (1) determining the probability that a subset of one of the sequences of pointers leading from the root to that node represents a subset of the output symbols in one of the documents; (2) invoking the procedure for the next level, if the determined probability exceeds the minimum probability value of that level; and (3) adding a pointer to that document in the list of pointers of the leaf node associated with that sequence of pointers, if the next level is the last level and the probability is greater than the threshold value. The procedure is repeated for each other document.

19 Claims, 4 Drawing Sheets

U.S. PATENT DOCUMENTS

| | | | |
|---|---|---|---|
| 4,028,673 | 6/1977 | Taylor et al. | 382/1 |
| 4,419,740 | 12/1983 | Hevenor, Jr. | 395/425 |
| 4,553,206 | 11/1985 | Smutek et al. | 395/275 |
| 4,601,012 | 7/1986 | Aiken, Jr. | 395/575 |
| 4,653,107 | 3/1987 | Shojima et al. | 382/13 |
| 4,975,975 | 12/1990 | Filipski | 382/38 |
| 4,989,258 | 1/1991 | Takahashi et al. | 382/38 |
| 5,014,327 | 5/1991 | Potter et al. | 382/14 |
| 5,033,087 | 7/1991 | Bahl et al. | 395/2.65 |
| 5,065,431 | 11/1991 | Rollett | 381/43 |
| 5,105,470 | 4/1992 | Will | 382/21 |
| 5,123,057 | 6/1992 | Verly et al. | 382/37 |
| 5,129,002 | 7/1992 | Tsuboka | 395/2.49 |
| 5,136,687 | 8/1992 | Edelman et al. | 395/22 |
| 5,151,950 | 9/1992 | Hullender | 382/13 |
| 5,202,986 | 4/1993 | Nickel | 395/600 |
| 5,226,091 | 7/1993 | Howell et al. | 382/3 |
| 5,241,619 | 8/1993 | Schwartz et al. | 395/2 |
| 5,263,097 | 11/1993 | Katz et al. | 382/48 |
| 5,335,289 | 8/1994 | Abdelazim | 382/9 |
| 5,347,595 | 9/1994 | Bokser | 382/36 |

METHOD FOR INDEXING AND SEARCHING HANDWRITTEN DOCUMENTS IN A DATABASE

This application is a continuation of application Ser. No. 08/248,392 filed May 24, 1994 now abandoned.

FIELD OF THE INVENTION

The present invention relates generally to methods for searching for documents in a database, and in particular to a method for indexing and searching for electronic handwritten documents.

BACKGROUND OF THE INVENTION

Electronic pictures and handwritten documents are entering common use in computers due to the introduction of pen based interfaces. Recent products have replaced the keyboard entirely by a pen with which all data entry is performed.

In a paper by D. Lopresti, and A. Tomkins, entitled "Pictographic Naming", INTERCHI '93 Adjunct Proceedings, April, 1993 (which is incorporated herein by reference for its teachings on use of pictographic names), the authors propose extending the range of acceptable document names to include arbitrary hand-drawn pictures. When a document is created or first stored in a storage medium, the author draws a pictographic name instead of typing in a textual name. To subsequently retrieve one of the documents, the pictographic names may be displayed in a menu or "browser", and the user selects the desired pictographic name.

If the database includes more than about 8–12 documents, it becomes impractical to display all of the pictographic names during retrieval.

In an alternative method to subsequently retrieve one of the documents, the pictographic name is redrawn using a pen based interface. Because the hand-drawn pictures are not drawn in exactly the same way each time, a pattern recognition technique is needed to determine which document (or output sequence) a given hand-drawn picture (or input sequence) is intended to represent.

One of the proposed techniques for identifying a document by its pictographic name involves the use of Hidden Markov Models (HMM) to provide a list of candidate documents that have pictographic names most closely resembling the input sequence. From this list, one file is selected using the pen. HMMs provide a powerful tool for picture and handwritten document matching. Several researchers have used HMMs to model handwriting and handwritten documents.

Rabiner, L. R., "A Tutorial on Hidden Markov Models and selected Applications in Speech Recognition", Proceedings of the IEEE, 77(2):257–285, February 1989, is incorporated by reference herein for its teachings on the use of Hidden Markov Models for pattern recognition.

Formally, an HMM is a doubly stochastic process that contains a non-observable underlying stochastic process (hidden) that is uncovered by a set of stochastic processes that produce the sequence of observed symbols. Mathematically an HMM is a tuple $<\sigma, Q, a, b>$, where:

1) $\sigma$ is a (finite) alphabet of output symbols. A symbol is typically a subset of a character.

2) Q is a set of states, $Q=\{0, \ldots, N-1\}$ for an N-state model.

3) a is a probability distribution that governs the transitions between states. The probability of going from state i to j is denoted by $a_{ij}$. The transition probabilities $a_{ij}$ are real numbers between 0 and 1, such that:

$$\text{for all } i \in Q: \sum_{j=0}^{N-1} a_{ij} = 1 \quad (1)$$

The distribution includes the initial distribution of states, that is the probability $a_i$ of the first state being i.

4) b is an output probability distribution $b_i(s)$ that governs the distribution of output symbols for each state. That is, $b_i(s)$ is the probability of producing the symbol $s \in \sigma$ while being in state i. These probabilities follow the rules:

$$\text{For all } i \in Q \text{ and } s \in \sigma: 0 < b_i(s) \leq 1 \quad (2)$$

$$\text{For all } i \in Q, \Sigma_{s \in \sigma} b_i(s) = 1 \quad (3)$$

Usually, when HMMs are used, the transition probabilities (a) and the state set (Q) are computed by bestfitting the model to a series of samples. (This is known as training the model). Each sample consists of a sequence of output symbols (points), with which the parameters of the model may be adjusted. However, in applications such as recognition of handwritten documents, the model is described using a single sample (a sequence of output symbols for the document that is to be indexed). Quite commonly, then, the structure of the model is "fixed" to make up for the lack of samples with which to train it. That is, once a model is selected for an index, that model is used for the life of the index. The model is not changed dynamically after the index is created. For example, a left-to-right HMM may be used, i.e. a model in which it is only possible to remain in the current state or to jump to the next state in sequence.

For the handwritten document problem, each picture or document in the database is modeled by an HMM. As a result, given an input pattern, the recognition process involves executing each HMM in the database and selecting the one that generates the input pattern with highest probability. This is very time consuming. The primary impediment to using HMMs is execution speed, especially in the context of large databases. Executing a respective HMM for each document in the database in real-time to retrieve one of the documents introduces an unacceptable delay into the process of retrieving a document, making the use of pictographic names by this method impractical.

SUMMARY OF THE INVENTION

The present invention is a method for indexing a plurality of electronic handwritten documents. Each document includes a plurality of output symbols ordered in an output sequence. Each document is modeled by a respective Hidden Markov Model (HMM). The Hidden Markov Models have a common alphabet including n output symbols, and a common output sequence length of T symbols, where n and T are integers.

An information tree is established. The tree comprises T+1 levels of linked nodes stored in a memory. The T+1 levels are ordinally numbered zero$^{th}$ through T$^{th}$. The zero$^{th}$ level has a root node. Each node in the T$^{th}$ level is a leaf node. Each node between the zero$^{th}$ level and the T–1$^{th}$ level has n pointers. Each of the n pointers identifies a respectively different node in the next level of the tree. The pointers between the zero$^{th}$ and T–1$^{th}$ levels form sequences of pointers. Each sequence of pointers leads from the root node to a respectively different one of the leaf nodes. Each leaf node is associated with a respectively different sequence of output symbols A procedure is executed, for each one of a subset of the nodes in one of the levels. The procedure includes the steps of:

(i) determining the probability that a subset of one of the sequences of pointers leading from the root node to that node represents a subset of the output symbols in one of the documents being indexed;

(ii) invoking the procedure for the next level, if the determined probability exceeds the minimum probability value of that level and the next level is between the one$^{th}$ level and the T–1$^{th}$ level; and (iii) adding a pointer to the one document in the list of pointers of the leaf node associated with that sequence of pointers, if the next level is the T$^{th}$ level and the probability is greater than the threshold value.

The procedure is repeated for each document to be indexed in the database.

According to a further aspect of the invention, the documents are searched by providing a set of T input symbols. One of the sequences of pointers that corresponds to the T input symbols is selected. The subset of the plurality of documents in the list of the leaf node which the selected sequence of pointers points to is identified as being found by the search.

OVERVIEW

Figure 1:
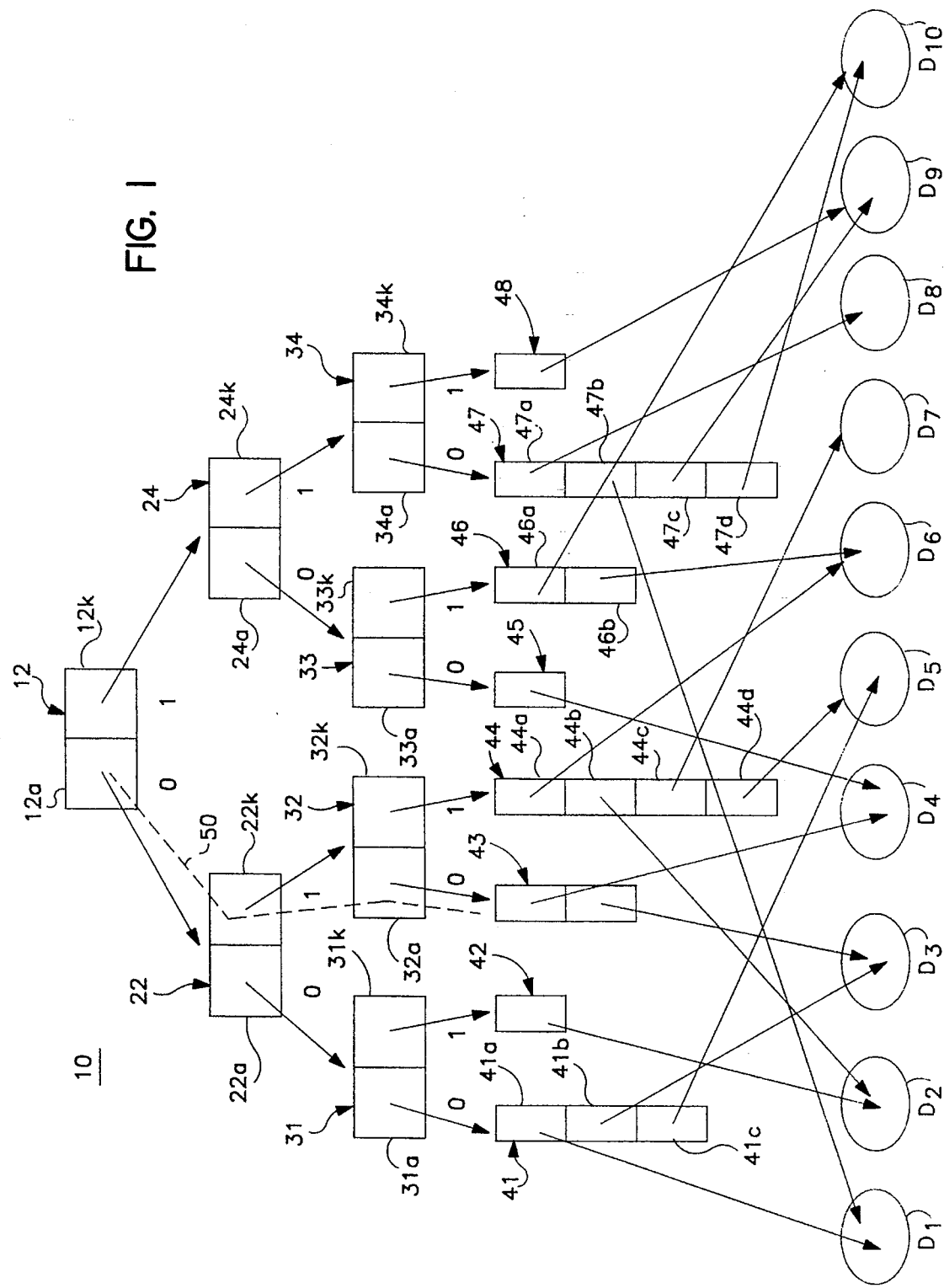
FIG. 1 is block diagram of an exemplary information tree according to the invention.

Referring to FIG. 1, the present invention is a method for indexing a plurality of electronic handwritten documents, such as documents $D_1$–$D_{10}$. For simplicity, FIG. 1 shows a simplified index in which the alphabet has only two symbols (0 and 1), and the sequence length is three symbols. According to the invention, the features of each document are analyzed using HMMs, in a preprocessing stage at the time of indexing, and stored in the index.

The results of the HMM analysis are subsequently used for matching input sequences having similar features with stored documents during document retrieval operations. It is not necessary to run the HMMs each time that a document is retrieved. During retrieval, the features are simply compared to the stored sequences in the index, and the results of the previously executed HMMs identify the documents that have a high probability of being represented by the sequence of input symbols. Thus, when the input sequence is detected, it is not directly interpreted to identify the matching output sequence; instead, it is compared to output sequences previously associated with stored documents using the stored HMMs.

The documents are stored in a repository or database. Each document $D_1$–$D_{10}$ includes a plurality of symbols, ordered in an output sequence. When a document is added to the database, a fixed integral number (T) of symbols from the document are used for indexing. The T symbols may form a pictographic name, or they may be the first T symbols within the text of the document itself. In the exemplary embodiment, the output sequence length T is the number of symbols in the document name.

Each document $D_1$–$D_{10}$ is modeled by a respective Hidden Markov Model (HMM). The HMMs have a common alphabet including n output symbols, and a common output sequence length of T symbols where n is an integer. Hereafter, references to the output symbols in the document are used to indicate the output symbols in the name of the document.

The index is built as a tree 10. The tree 10 has T+1 levels (where T is the number of steps or length of the output sequence in the HMMs associated with the documents in the repository or database). The root of the tree 10 is the node 12 at level 0 and is denoted by r. Each level of the tree corresponds to a respective successive symbol in the document. Each level of the tree 10 is associated with a threshold value that controls the accuracy of the searches.

Each internal node 12, 22, 24, and 31–34 (including the root node 12) in the tree 10 is an n-tuple, where each entry in the n-tuple corresponds to a respectively different symbol of the output alphabet σ and has a pointer to a subtree. v[k] denotes the k$^{th}$ entry on the node v, where k is an integer between 0 and n (in the example shown in FIG. 1, n=2).

Each internal node 31–34 in the T–1$^{th}$ level points to a leaf node 41–48 in the T$^{th}$ level that contains a linked list of pointers. For example, linked list 41 includes pointers 41a–41c. The linked lists 41–48 store pointers to the files $D_1$–$D_{10}$ that contain the documents in the repository.

Successive pointers within respective branches of the tree form sequences of pointers. For example, FIG. 1 shows a sequence 50 of pointers for the input sequence 0, 1, 0. That is, given the first input symbol, 0, the zero$^{th}$ pointer 12a of node 12 points to node 22. Given the next input symbol, 1, the one$^{th}$ pointer 22k of node 22 points to node 32. Given the next input symbol, 0, the zero$^{th}$ pointer 32a of node 32 points to leaf node 43.

One of ordinary skill will understand that there is a one-to-one correspondence between the possible input sequences and the leaf nodes. Table 1 lists the input sequences shown in FIG. 1, and the corresponding leaf nodes (identified by reference numeral).

TABLE 1

| Input Sequence | Ref No. |
|---|---|
| 0,0,0 | 41 |
| 0,0,1 | 42 |
| 0,1,0 | 43 |
| 0,1,1 | 44 |
| 1,0,0 | 45 |
| 1,0,1 | 46 |
| 1,1,0 | 47 |
| 1,1,1 | 48 |

To insert a document, a set of T output symbols are extracted from the document. In the example of FIG. 1, three symbols (T=3) are extracted, each symbol being a zero or a one.

There are $n^T$ possible output sequences, based on an alphabet of n symbols, and a sequence length T. Thus the tree (as shown in FIG. 1) has $n^T$ leaf nodes, one for each respective possible output sequence. According to a first exemplary embodiment, the HMM for the document being inserted is executed $n^T$ times during the preprocessing (insertion) stage (Each HMM is executed a respectively different time for every possible sequence). If the HMM determines that the probability of a given output sequence representing the output sequence of the document is greater than a threshold value, then a pointer to that document is added to the linked list identified by the sequence of pointers corresponding to that output sequence. This determination is made for each leaf node.

For example, given the tree 10, the HMM for document $D_1$, designated $HMM_1$ is executed eight times (once for each of the output sequences listed in Table 1). When $HMM_1$ is executed for a given output sequence, $HMM_1$ determines the probability that the output sequence represents the T symbols in the output sequence of document $D_1$. As shown in FIG. 1, only two of the output sequences (0,0,0 and 1,1,0) have the desired probability of representing the output sequence (i.e., the probability is greater than the threshold). Therefore, pointers 41a, 47b to document $D_1$ are added to the respective linked lists of leaf nodes 41 and 47.

The linked lists are completed by executing each of the other HMMs (designated $HMM_2, \ldots, HMM_{10}$) eight times, once per possible output sequence. A pointer to each document $D_2$–$D_{10}$ is then added to the linked list of each leaf node 41–48 for which the probability of the respective output sequence being equal to the document output sequence exceeds the desired threshold.

Once the documents are thus processed and indexed, retrieval of a document or set of documents may be performed very quickly. To retrieve a document, the user draws the pictographic name with the input device. The input sequence of symbols are detected. Using the one-to-one correspondence shown in Table 1, the leaf node 41–48 corresponding to the input sequence may be found, by traversing the tree (following the path of pointers from the root node 12 to the leaf node 41–48).

Alternatively, instead of storing pointers and traversing the tree, the location of the leaf node 41–48 may be computed as a function of the input sequence (because the tree is a complete tree with all of the nodes included). Once the leaf node is found, the user is presented with the list of documents contained in the linked list of the leaf node.

Preferably, the pictographic names of the documents found by the search are displayed in pictographic form within a menu, using a graphical user interface. The user then selects the desired document from the displayed list. In the example shown in FIG. 1, once the user draws the pictographic name, in the exemplary embodiment of the invention, the documents having the closest one to four names are displayed for selection. Thus, if the user drew a pictograph having the input symbols 0,1,0 (represented by sequence 50), then the system displays the pictographic names of documents $D_3$ and $D_4$. The user is spared the complexity of having to choose from among 10 documents, and the delays that would accompany execution of the HMMs during the document retrieval operations are avoided.

The first exemplary embodiment described above works well if the size of the alphabet and the number of symbols in the name of each document is relatively short. For example, in the index shown in FIG. 1, with two symbols in the alphabet, and a sequence length of three symbols, the total number of nodes in the tree is 15.

If, however, the size of the alphabet or the output sequence length becomes large, then the size of the index and the length of time required to create it grow exponentially. For example, if there are 50 symbols in the output sequence, and the alphabet includes 250 symbols, then the index has about $10^{120}$ nodes. This makes the first exemplary method described above impractical for many databases.

Figure 3:
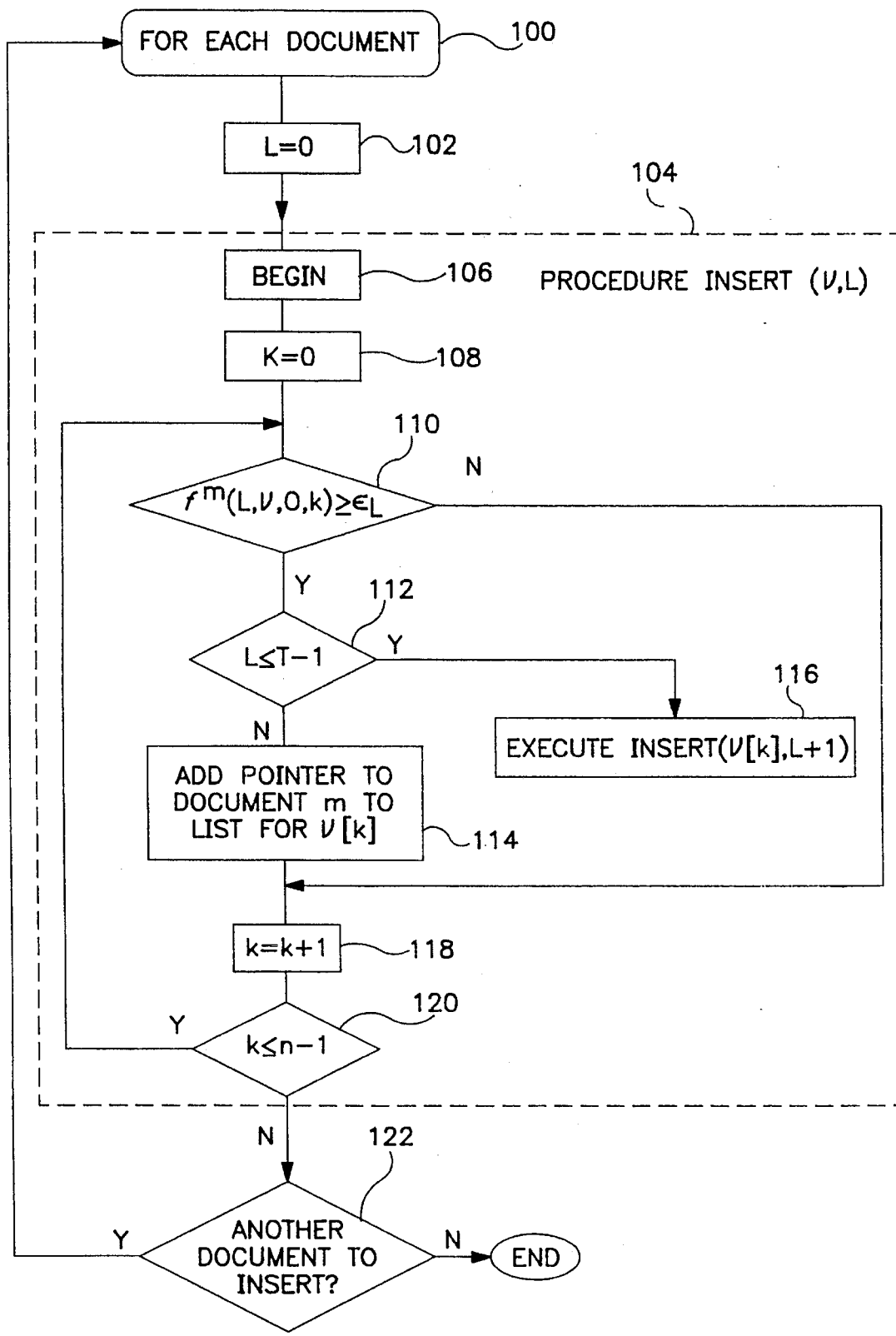
FIG. 3 is flow chart diagram of the procedure that indexes documents in the information tree of FIG. 1.

To reduce the amount of time required to create the index, the second exemplary method, described below with reference to FIG. 3, provides a technique for only computing probabilities and storing index entries for the branches of the tree that are likely to have leaf nodes that point to one or more documents. The second exemplary embodiment may use the same index as shown in FIG. 1. The details of the method are shown in the flow chart diagram of FIG. 3.

According to a further aspect of the invention, tree 10 may only contain nodes for each document identifying the input symbols at each level that have at least a threshold probability of representing the output sequence of the document at that level, reducing the size of tree 10 considerably. This aspect of the invention is explained in greater detail below with reference to FIGS. 4A–4C.

DETAILED DESCRIPTION

To insert a document, a set of T output symbols are extracted from the document. Although the simplified example shown in FIG. 1 only includes two symbols, the exemplary alphabet for handwritten documents includes 16 symbols. The hand-drawn figure is divided into points, and each point is represented by a symbol. In the exemplary symbol alphabet, four features are extracted per point: direction, velocity, change of direction and change of velocity. Each feature is drawn from a set of four possible values, hence the feature vector (symbol) for a point is represented using four pairs of bits. In the exemplary symbol alphabet, each one of the output symbols in σ is described by an eight bit vector value. It is contemplated that other equivalent symbol alphabets may be used. It is understood by one of ordinary skill in the art that each node in the tree has 16 entries for this exemplary alphabet; the full tree is not shown in the figures for brevity.

Figure 2:
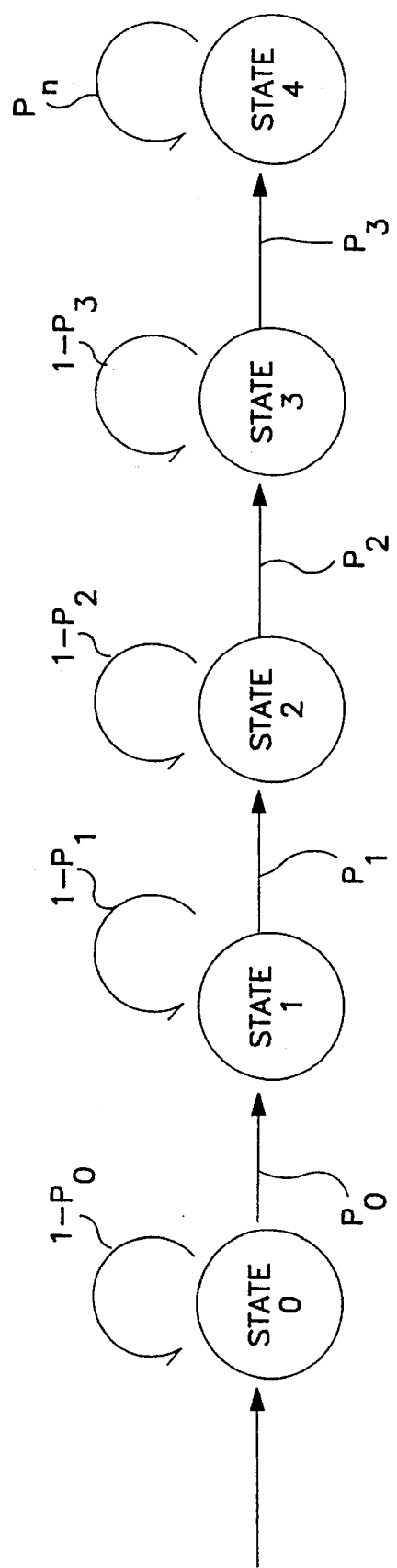
FIG. 2 is state diagram of a Hidden Markov Model used in the exemplary information tree of FIG. 1.

It is presumed that the individual symbols are detected by a conventional technique, such as a pen based interface. In the exemplary embodiment, once the individual symbols are detected, a left-to-right HMM is used to analyze the symbols. A left-to-right HMM is a model in which it is only possible to remain in the current state or to jump to the next state in sequence. An example of such an HMM is shown in FIG. 2. This model contains 5 states numbered from 0 to 4. In the exemplary HMM, the probability $p_i$, of jumping from state i to state i+1 is 0.5 for $0 \leq i \leq n-1$, while the probability of staying in the same state $(1-p_i)$ is 0.5. The probability $p_n$ of staying in the last state, once it is reached, is 1.0. It is understood by one skilled in the art that other HMMs may be used, so long as the selected HMM remains fixed throughout the life of the index and is not dynamically changed.

Each level L ($0 \leq L \leq T$) in the tree is assigned a respective minimum probability value $\epsilon_L$ ($0 \leq \epsilon_L \leq 1$).

For each node q in the tree 10, at level L, and each symbol o in the output alphabet, $O_q = O[i_1]O[i_2]\ldots O[i_L]$ denotes the sequence of symbols in the path from the root 12 of the tree to the node q. Then there is an associated pruning function $f^m(L, q, O_q, o)$ that is computable for every HMM (i.e., for every document) in the database.

Referring now to FIG. 3, an exemplary embodiment featuring another aspect of the invention is shown. A loop comprising steps 100, 102, 104 and 122 is executed. Step 100 selects one of the documents for which the loop is to be executed. At step 102, the level is reset to zero (the root node) before beginning the insertion procedure 104. For each document $D_1$–$D_{10}$ in the database, the procedure of step 104 is executed.

The insertion procedure of step 104 begins at step 108 by setting the value of k to zero. k is an integer index that has a value of 0 at the zero$^{th}$ node of each level of tree 10. At step 110, the pruning function computation is performed. For the combination of a given level L, a given node v, a subset O of the output sequence (including all of the nodes in the path between node v and the root), and a given value of the index k, the pruning function $f^m(L, v, O_v, k)$ provides the probability that each of the symbols in O represents the correct corresponding output symbol of the document $D_m$.

During step 110 of the insertion procedure, when processing node v at level L and output symbol k, if the condition $f^m(L, q, O_v, k) \geq \epsilon L$ is true, then at step 112, the subtree beginning with node v[k] is investigated. Otherwise, the entire subtree beginning with node v[k] is skipped by the insertion algorithm, by following the "No" branch of decision step 110. This reduces the number of probability computations, and hence, the time required to index each document when inserting the document into the database.

If the "Yes" branch of step 110 is taken, then at step 112, the level of the current node is checked. If the current node is an internal node (i.e., $L \leq T-1$), then control passes to step 116, where the insertion procedure of step 104 is executed recursively for the branch of the tree to which the k$^{th}$ entry (pointer) of the current node points. During the recursive execution of step 104, when the check at step 112 determines that the current level L is the T$^{th}$ level (a leaf node), then a pointer to document $D_m$ is added to the list of pointers stored in the leaf node.

At steps 118 and 120, once the index processing for $D_m$ is complete in the current subtree, any remaining subtrees are investigated by repeating steps 110–120 for each value of k (i.e., each node at the given level). When the value of k reaches n, processing for this document is completed, and at step 122, another document may be processed by transferring control to step 100.

As an example, referring again to FIG. 1, assume that document $D_7$ is being inserted into the database. From the symbol detection facility of the input device, a symbol string of 0, 1, 1 is detected. Processing begins at the root node 12. At step 110, for the zero$^{th}$ entry 12a of node 12 (which points to node 22), the function $f^m$ returns a probability greater than the minimum probability $\epsilon_0$ of the zero$^{th}$ level. Therefore, the branch to which entry 12a points is investigated.

At step 116, for the zero$^{th}$ entry 22a of node 22, the function $f^m$ returns a probability less than the minimum probability $\epsilon_1$ of the one$^{th}$ level, so the branch to which entry 22a points is not investigated. No probability calculations are performed for node 31. Next, for the one$^{th}$ entry 22k of node 22 (which points to node 32), the function $f^m$ is evaluated for the partial sequence 0, 1, and returns a probability greater than $\epsilon_1$. Therefore, the branch to which entry 22k points is investigated.

Evaluating the function $f^m$ at node 32, the probability is less than the minimum probability ($\epsilon_2$) for level two when evaluated for entry 32a, and is greater than $\epsilon_2$ when evaluated for entry 32k. Therefore, a pointer to document $D_7$ is stored in the list 44 to which entry 32k points.

Next, the function $f^m$ is evaluated for the one$^{th}$ entry 12k of node 12. The function returns a probability value that is less than $\epsilon_0$, so the branch to which entry 12k points is not evaluated.

Using the procedure of FIG. 3, the probability computations for document $D_7$ are thus avoided at nodes 31, 24, 33 and 34. Although the insertion delay (the preprocessing time when adding the document to the repository) is reduced, the index produced by the method of FIG. 3 still uses the same amount of memory shown in FIG. 1 for a tree in which n=2 and T=3. According to another aspect of the invention, the space occupied by the index may be reduced as well.

According to a further aspect of the invention, an array may be maintained for each document identifying all of the input symbols at each level that have a probability value of at least $\epsilon_L$ of representing the output sequence of the document at that level. By maintaining an array identifying the highly probable symbols at each level in each document, the size of tree 10 may be reduced considerably.

Referring to the example of document $D_1$ in FIG. 1, if document $D_1$ were the only document in the database, then because this document is associated with both leaf nodes 41 and 47, the tree would only include nodes 12, 22, 24, 31, 34, 41 and 47. The array would identify node 12 at level zero, nodes 22 and 24 at level 1, and nodes 41 and 47 at level two. Nodes 32, 33, 42–46 and 48 would not be included in the tree. When the size of the alphabet or the length of the document name is large, this aspect of the invention provides great reduction in the size of the tree.

Table 2 provides exemplary pseudocode for executing the method of FIG. 3

TABLE 2

| | |
|---|---|
| 200 | Procedure Build_Index |
| 202 | begin |
| 204 |     for each document |
| 206 |         Let r be the root of the tree |
| 208 |         level = 0 |
| 210 |         call search(r, level) |
| 212 | end |
| 220 | Procedure search(v,l) |
| 222 | begin |
| 224 |     for $0 \leq k \leq n-1$ |
| 226 |         if ($f^m(l,v,O_v,k \geq \epsilon_1$) |
| 228 |             if ($l \leq T-1$) |
| 230 |                 call search(v[k],l+1) |
| 232 |             else |
| 234 |                 include a pointer to $D_m$ in the list pointed to by v[k] |
| 236 | end |

During the insertion procedure of Table 2, when processing node v at level 1 and output symbol k (step 226), if the condition ($f^m(1, v, O_v, k) \geq \epsilon_1$) is true, then at steps 228–230, the subtree v[k] is investigated. Otherwise, steps 228–234 are not executed, and the entire subtree is skipped by the insertion algorithm. This helps reduce the time to insert each document into the database.

Table 3 lists pseudocode for traversing the index during document retrieval. To select a set of documents that are similar to an input document D, a set of T output symbols $O=(O[i], 0 \leq i \leq T, $ and $0 \leq O[i] \leq n-1)$ are extracted from the input sequence, and procedure traverse (listed in Table 3 is executed. Alternatively, the address of the leaf node may be computed from the set of output symbols O and the k HMMs associated with it may be directly accessed.

TABLE 3

```
250  Procedure traverse(0)
252  begin
254      v=r
256      for (0 ≤ level ≤ T)
258          v= v[O[1]]
260      return every element in list pointed to by v
262  end
```

The index 10 described above with reference to FIG. 1 works so long as the pruning function $f^m(1,q,O_q,o)$ is provided. The "performance" of the index is affected by how effective the pruning function is. Performance of the index may be measured by whether the method provides the correct pictographic name as the first choice, or by whether the method includes the correct name as one of several names within a list from which the user selects the correct document.

PRUNING FUNCTIONS

To compute $f^m(1,q,O_q,o)$, it is assumed that the following conditions are met by the underlying database of documents:

(1) All of the documents in the database are modeled by left-to-right HMMs, each HMM having N states. The transition probabilities of these HMMs may be the following:

$$a_{ij}=0.5 \text{ for } i=0,\ldots,N-2 \text{ and } j=i \text{ or } j=i+1 \quad (1)$$

$$a_{N-1,N-1}=1.0 \quad (2)$$

$$a_0=1, a_i=0 \text{ for } i=1,\ldots,N-1 \quad (3)$$

For all the documents in the database, a sequence of output symbols of length T is extracted. All inputs for which the index is to be used are presented in the form of a sequence of T output symbols, taken from the alphabet ($\Sigma$) of the HMMs.

Several variations of the pruning function $f^m$ may be used. The first exemplary pruning function is generated as follows:

Define $\phi_{i,j}^m$ to be the probability that the HMM $H_m$ is in state j at step i of its execution ($0 \leq i \leq T-1$, and $0 \leq j \leq N-1$). Notice that $\phi_{i,j}^m$ is independent of the output sequence O. Now, define $\Phi_i^m(o)$ to be the probability that the HMM $H_m$ outputs the symbol o at step i of execution. $\Phi_i^m(o)$ may be computed using $\phi_{i,j}^m$ as follows:

$$\Phi_i^m(o) = \sum_{j=0}^{N-1} \phi_{i,j}^m b_j \quad (4)$$

$$f^m(i, q, O_q, o) = \Phi_i^m(o) \quad (5)$$

where, based on Equations (1)–(3):

$$\phi_{i,0}^m = 0.5^i \text{ for } i=0,\ldots,T-1 \quad (6)$$

$$\phi_{0,j}^m = 0, \text{ for } j=1,\ldots,N-1 \quad (7)$$

and $$\phi_{i,j}^m = 0.5(\phi_{i-1,j-1}^m + \phi_{i-1,j}^m) \quad (8)$$

for $i=1,\ldots,T-1$ and $j=1,\ldots,N-1$
where:

$$\phi_{i,j}^m = 0 \text{ for } 0 \leq i \leq j \leq N-1 \text{ and } i=1,\ldots,T-1 \quad (9)$$

Based on Equations (1) through (9), the process of computing $\phi$ and $\Phi$ is independent of which branch of the tree 10 is being processed. It is dependent only on the HMM model ($H_m$). As a result, when inserting an HMM model $H_m$ into the tree, a matrix $\Phi^m[][]$ of size T×N is built, such that $\Phi^m[i][j]$ corresponds to the probability that the $j^{th}$ output symbol appears at the $i^{th}$ step of executing the HMM $H_m$. That is, $$\Phi^m[i][j]=\Phi_i^m(o_j) \quad (10)$$

The matrix $\Phi^m[i][j]$ is accessed while inserting the model $H_m$ into the tree 10 to prune the number of paths descended by the method of FIG. 3.

A second exemplary pruning function makes use of the dependencies between the output symbols. For example, instead of computing the probability that an output symbol appears at step i of the execution of an HMM, the probability that the sequence O[0]O[1] ... O[i] appears after executing the first i steps of the HMM may be computed. This leads to the second exemplary pruning function which depends on the path in the tree into which a new HMM is inserted.

The method to insert the index m of an HMM $H_m$ into the linked list belonging to a leaf node q, when the probability that the sequence $O_q$=O[0]O[1], ... , O[T-1] (denoting the sequence of symbols in the path from the root 12 of the tree 10 to the node q) is produced by $H_m$ is high (or above a given threshold). This corresponds to the probability: Prob[O[0]O[1], ... , O[T-1] | $H_m$]. To save on insertion and preprocessing times, this probability should not be computed for every possible pattern (of length T) in the tree 10. As a result, the following pruning function is applied as the tree is descended. Hence entire subtrees may be pruned.

To use the second exemplary embodiment of the pruning function, define $\alpha^{i,j,m}$ to be the probability that the sequence O[0]O[1] ... O[i] is produced by the HMM after executing i steps and ending at state j. That is:

$$\alpha_{i,j}^m = \text{Prob}[O[0]O[1],\ldots,O[i] | \text{ the state at step } i \text{ is equal to } j] \quad (11)$$

At the time an HMM model $H_m$ is inserted into the tree 10, $\alpha$ is computed dynamically as the tree 10 is descended, while constructing the sequence O[0]O[1], ... ,O[i] on the fly. Assume that the tree is descended in a depth-first order, to level j of the tree 10, at node q. The sequence $O_q$=O[0]O[1], ... ,O[i] corresponds to the symbols encountered while descending from the root to q. In this case, $\alpha$ may be computed as follows:

$$\alpha_{0,0}^m = b_0(O[0]) \quad (12)$$

$$\alpha_{i,0}^m = \alpha_{i-1,0}^m b_0(O[i]) \quad (13)$$

$$\alpha_{0,j}^m = 0, \text{ for } j=1,\ldots,N-1 \quad (14)$$

$$\alpha_{i,j}^m = 0, \text{ for } 0 \leq i \leq j \leq N-1 \text{ and } i=1,\ldots,T-1 \quad (15)$$

$$\alpha_{i,j}^m = 0.5(\alpha_{i-1,j}^m + \alpha_{i-1,j-1}^m)b_j(O[i]) \text{ for } 1 \leq j \leq i \leq N-1 \text{ and } i=1,\ldots,T-1 \quad (16)$$

The difference between the first and second exemplary pruning functions is that $\alpha$ depends on the output sequence produced up to step i of the computation, but $\phi$ does not. In addition, Φ depends only on one output symbol and not the sequence of symbols as does α. The recursion process for computing α is the same as that used to compute φ, except that the φ computations are replaced by α computations.

One way to reduce the time for computing α for all the paths is to maintain a stack of the intermediate results of the recursive steps. When the traversing of a subtree is finished, the stack is popped up to the root level of the subtree (i.e., the node in the subtree closest to the root of the tree), and the recursion is started from there, instead of starting the computations from the root of tree 10. As the tree 10 is descended, to insert a model $H_m$, when processing a node q, processing starts from the α's in the parent of node q. One step of the recursive process is applied for computing α for each of the symbols in q. The resulting n computations are saved in the stack (there are n symbols in q).

While descending one of the subtrees below q, for example, at node u, the α's computed for node q are used in one additional step of the recursive formula for computing α and the corresponding α's at node u are obtained. This way the overhead for computing α's is minimal, because, for each node in the tree 10, one step of the recursive formula is applied for computing α for each symbol in the node. The entire procedure is performed only once per node, i.e., the α's for a node are not evaluated more than once.

To prune the subtrees accessed at insertion time, α is used to compute a new function $\phi_i^m$, which is the probability that a symbol O[i] appears at step i of the computation (i.e., $\phi_i^m$ is independent of the information about the state of the HMM). This may be achieved by summing $\alpha_{i,j}^m$ over all possible states j. Then, $$\phi_i^m = Prob[O[0]O[1], \ldots, O[i] \mid Hm \text{ is at step } i] \quad (17)$$

$$\phi_i^m = \sum_{j=0}^{N-1} \alpha_{i,j}^m \quad (18)$$

φ is computed for each symbol in a node and is compared to a threshold value. The subtree corresponding to a symbol is accessed only if its corresponding value of φ exceeds the threshold. In other words, the pruning function for each node is defined by:

$$f^m(1,q,O_q,o) = \phi_1^m \quad (19)$$

The computations for φ are exact and hence may be computationally expensive to evaluate for each input pattern and each tree path that is accessed by the insertion algorithm. A third exemplary method is now provided, which is an approximation of the pruning function φ, presented in Equations (17)14 (19). The pruning function φ may be approximated, so that it is dependent only on the level of a node q and not on the entire tree path that leads to q.

Define $P_k^m(s)$ to be the computed probability (or an estimate of it) that a model predicts the output symbol s in the $k^{th}$ stage of executing the HMM $H_m$. Then, $p_0^m(s)$ is the probability of finding output symbol s in the first step. The inventors have determined that $p_k^m(s)$ may be estimated as follows:

$$p_k^m(s) = \sum_{j=0}^{N-1} A_{T-k+1,j} \quad (20)$$

where $A_{T-k+1,j}$ is an upper bound of $\alpha_{i,j}$ defined by Equations (11)–(16) and is estimated as follows:

$$A_{T-k+i,j} = (0.5)^T \left\{ \binom{T-k+1}{j} b_0(O[k]) + \quad (21) \right.$$

-continued $$\left. \binom{T-k+1}{j-1} R_1 b_1(O[k]) + \ldots + \binom{T-k+1}{j-k+1} R_j b_j(O[k]) \right\}$$

for $k \leq j \leq N-1$ where $R_r$ is the number of paths that may be taken to get to state r in k–1 steps and is evaluated as follows:

$$R_r = \binom{k-1}{r-1} \quad (22)$$

Table 4 lists exemplary pseudocode for computing A and $p_k^m(s)$.

TABLE 4

| | |
|---|---|
| 270 | Procedure solve_recurrence(k,j) |
| 272 | begin |
| 274 | $A_{T-k+1i, j} = 0$ |
| 276 | for i = j to 0 |
| 278 | $A_{T+1,j} = A_{T-k+1,j} + \binom{T-k+1}{i} R_i b_i(O[k])$ |
| 280 | $A_{T-k+1,j} = (0.5)^T A_{T-k+1,j}$ |
| 282 | return($A_{T-k+1,j}$) |
| 284 | end |
| 286 | Function p(k,m,s) |
| 288 | begin |
| 290 | p = 0 |
| 292 | for (j = 0 to N – 1) |
| 294 | p = p+ solve_recurrence(k,j) |
| 296 | return(p) |
| 296 | end |

REDUCING STORAGE SPACE FOR THE TREE

As noted above, the size of the tree 10 (shown in FIG. 1) grows exponentially, as the number of symbols in the alphabet and the document output sequence length grow. A further exemplary tree structure is now described, which is an enhancement over the tree 10 of FIG. 1, in terms of its storage complexity.

Figure 4A:
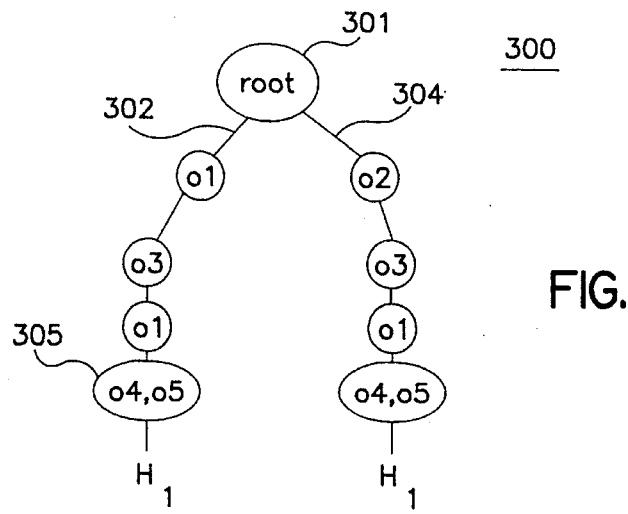
FIGS. 4A–4C are block diagrams of a further exemplary information tree according to the invention.
Figure 4B:
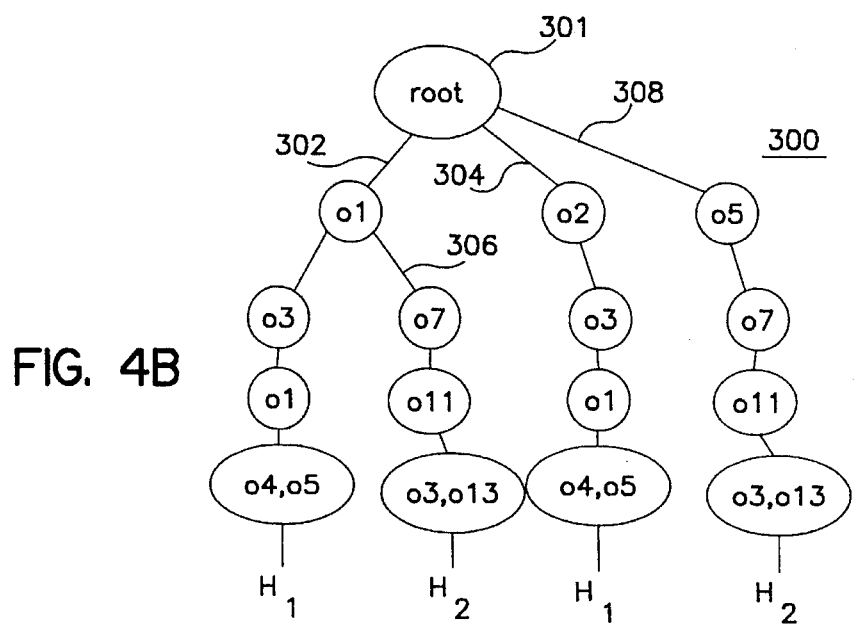
Figure 4C:
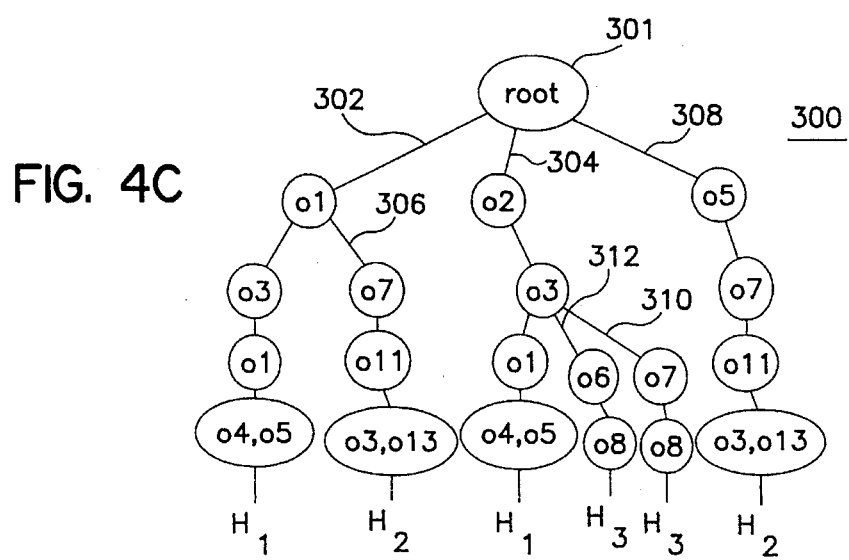

Referring now to FIGS. 4A to 4C, a second exemplary tree 300 is shown, in which the pruning function is used not only to prune the insertion time, but also to prune the amount of space occupied by the tree. Assume that a model $H_m$ is inserted into the tree. Given the pruning function (any of the functions Φ, φ, or p described above), a two dimensional matrix $P^m$ is computed, where each entry $P^m[i][o]$ corresponds to the probability that $H_m$ produces symbol o at step i of its execution. $P^m$ is of size n×T, and thus does not grow exponentially as the alphabet and output sequence sizes grow. From $P^m[i][o]$, a new vector $L^m$ is generated, where each entry in $L^m$, designated $L^m[i]$, contains only the symbols that have a high probability of being generated by $H_m$ at step i of its execution. In other words, each entry of $L^m$ is a list of output symbols such that:

$$L^m[i] = [o \mid P^m[i][o] > \epsilon_i \text{ for all } o, 0 \leq o < n] \quad (23)$$

For example, exemplary vectors $L^1$, $L^2$, and $L^3$ are listed below in Table 5. Vectors $L^1$, $L^2$, and $L^3$ correspond to the HMMs $H_1$, $H_2$, and $H_3$, respectively.

TABLE 5

| $L^1$ | $L^2$ | $L^3$ |
|---|---|---|
| 01, 02 | 01, 05 | 02 |
| 03 | 07 | 03 |
| 01 | 011 | 06,07 |

TABLE 5-continued

| L¹ | L² | L³ |
| --- | --- | --- |
| 04, 05 | 03, 013 | 08 |

FIGS. 4A–4C are block diagrams showing the tree 300 that is formed from the vectors $L^1$, $L^2$, and $L^3$ according to this embodiment. For conciseness, pairs of nodes in the fourth level of tree 300 are shown within single ellipses (e.g., ellipse 305). It is understood that an ellipse having two symbol numbers represents two nodes. For example, ellipse 305 in FIG. 4A has the numbers 04 and 05, indicating a first node for the output symbol 04 and a second node for the output symbol 05. Additionally, the leaf nodes (which contain the linked lists of pointers to documents) in the fifth level of the tree 300 are omitted from FIGS. 4A to 4C for brevity.

In the example of FIGS 4A, 4B and 4C, the alphabet size n is 13 symbols, and the sequence length is four. If every node were included in the tree without regard to whether the node is part of a probable output sequence (i.e., according to the method of FIG. 1), then tree 300 would have approximately $n^{T+1}=13^5=371,293$ nodes (including the leaf nodes, not shown in FIGS. 4A–4C). Instead, by only including the nodes in the high probability sequences, the size of the tree is reduced to 34 (including root and leaf nodes). Even when the size of the matrices $P^m[i][o]$ and $L^m$ are considered, the reduction in space is greater than three orders of magnitude.

Initially the tree 300 is empty, except for the root node 301. FIG. 4A shows the result of inserting $H_1$ into the tree 300. The fanout of each node in the tree 300 is less than n, the size of the alphabet. The output symbols are added in the internal nodes only as necessary. FIGS. 4B and 4C show the resulting tree 300 after inserting $H^2$ and $H^3$ respectively The tree 300 is only expanded as necessary to include nodes that correspond to symbols within sequences most likely to represent at least one document. Hence, tree 300 avoids wasting space storing pointers to leaf nodes that do not have pointers to any documents.

The tree 300 has the advantages of both the tree 10 of FIG. 1 and the pruning functions $f^m$ used in FIG. 3, while surpassing the performance of both in terms of space complexity. The tree 300 has a searching time of O(T) similar to the tree 10 of FIG. 1, and uses the same pruning strategies for insertion as described above with reference to FIG. 3, hence reducing the insertion time.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method for indexing a plurality of electronic handwritten documents, each of which includes a plurality of output symbols ordered in an output sequence, each document being modeled by a respective Hidden Markov Model (HMM), the Hidden Markov Models having a common alphabet including n symbols, and a common output sequence length of T symbols, where n and T are integers, the method comprising the steps of:

(a) establishing an index of symbols, each symbol being a feature vector, the index having T levels, each level between zero and T−1 having a respective minimum probability value, each level having at least one node;

(b) indexing the symbols in one of the documents without translating the symbols into one of a known character and a known pictograph by performing, for each node in one of the levels of the index, the steps of:

(1) determining a probability that a symbol stored in said node represents a corresponding output symbol in the one document, using the respective HMM for the one document, (2) adding a node in a next level of the index, if the probability determined in step (b)(1) exceeds the minimum probability value of the one level and the next level is between the one$^{th}$ level and the T−1$^{th}$ level, (3) executing step (b) for the added node in the next level, if the node is added in step (b)(2), and (4) adding a pointer to the one document in a list of pointers stored in a node in the T$^{th}$ level of the index, if the next level is the T$^{th}$ level and the probability determined in step (b)(1) is greater than the minimum probability value of the T−1$^{th}$ level; and (c) repeating step (b), for each of the plurality of documents other than the one document.

2. A method according to claim 1, wherein step (b) includes performing steps (b)(1) through (b)(4) n times at said node, corresponding to one time for each of said n output symbols.

3. A method according to claim 1, wherein each symbol comprises a direction coordinate.

4. A method according to claim 3, wherein each symbol further comprises a velocity coordinate.

5. A method according to claim 3, wherein each symbol further comprises a change-of-direction coordinate and a change-of-velocity coordinate.

6. A method for indexing a plurality of electronic handwritten documents, each of which includes a plurality of output symbols ordered in an output sequence, each document being modeled by a respective Hidden Markov Model (HMM), the Hidden Markov Models having a common alphabet including n output symbols, and a common output sequence length of T symbols, where n and T are integers, the method comprising the steps of:

(a) establishing an index of symbols without translating the symbols into one of a known character and a known pictograph, each symbol being a feature vector, the index comprising T+1 levels of linked nodes stored in a memory, the levels ordinally numbered zero$^{th}$ through T$^{th}$, the zero$^{th}$ level having a root node, each node in the T$^{th}$ level being a leaf node, each node between the zero$^{th}$ level and the T−1$^{th}$ level having n pointers, each corresponding to a respectively different output symbol and identifying a respectively different subtree of the respective node, the pointers between the zero$^{th}$ and T−1$^{th}$ levels forming sequences of pointers, each of the sequences of pointers leading from the root node to a respectively different one of the leaf nodes;

(b) storing a respective list of pointers identifying a subset of the plurality of documents in one of the leaf nodes, comprising the steps of:

(1) determining, for the one leaf node, a probability that the respective sequence of pointers leading from the root node to the one leaf node represents the respective output sequence of one of the documents, using the respective HMM for that document, (2) adding a pointer to the one document in the list of pointers of the one leaf node, if the probability is greater than a threshold value, (3) repeating steps (1) and (2) for each one of the plurality of documents;

(c) repeating step (b) for each of the leaf nodes other than the one leaf node.

7. A method according to claim 6, wherein each level between zero and T–1 has a respective minimum probability value, and step (b)(1) comprises the steps of:
  (i) determining a probability that a subset of said sequence of pointers leading from the root node to the jth node represents the first j+1 symbols in the one document, where j is an integer between zero and T–1, and
  (ii) repeating step (i) for each value of j between one and T–1, while said probability determined in step (i) for the j–1$^{th}$ level exceeds the respective minimum probability value of the j–1$^{th}$ level.

8. A method for indexing a plurality of electronic handwritten documents, each of which includes a plurality of output symbols ordered in an output sequence, each document being modeled by a respective Hidden Markov Model (HMM), the Hidden Markov Models having a common alphabet including n output symbols, and a common output sequence length of T symbols, where n and T are integers, the method comprising the steps of:
  (a) establishing an index of symbols without translating the symbols into one of a known character and a known pictograph, each symbol being a feature vector, the index comprising T+1 levels of linked nodes stored in a memory, the levels ordinally numbered zero$^{th}$ through T$^{th}$, the zero$^{th}$ level representing a root node, each node in the T$^{th}$ level being a leaf node, each level of the index between zero and T–1 having a respectively different minimum probability value and, each node between the zero$^{th}$ level and the T–1$^{th}$ level having n pointers, each identifying a respectively different node in a next level of the index, the pointers between the zero$^{th}$ and T–1$^{th}$ levels forming sequences of pointers that represent sequences of output symbols, each sequence of pointers leading from the root node to a respectively different one of the leaf nodes, each leaf node being associated with a respectively different sequence of output symbols;
  (b) storing information in the index for one of the documents, comprising the steps of:
    (1) performing, for each one of a subset of the nodes in one of the levels, the steps of:
      (i) determining a probability that a subsequence of one of said sequences of pointers leading from the root node to the one node represents a corresponding subset of the output symbols in the one document,
      (ii) invoking step (b) for a node in a next level, if the probability determined in step (b)(1)(i) exceeds the minimum probability value of the one level and the next level is between the one$^{th}$ level and the T–1$^{th}$ level, and
      (iii) adding a pointer to the one document in the list of pointers of the leaf node associated with the one sequence of pointers, if the next level is the T$^{th}$ level and the probability is greater than the threshold value; and
    wherein step (b)(1) includes performing steps (b)(1)(i) through (b)(1)(iii) n times at said one node, corresponding to one time for each of said n output symbols; and
  (c) repeating step (b), for each of the plurality of documents other than the one document.

9. A method according to claim 8, wherein step (b)(1) further comprises the steps of:
  (iii) discontinuing repetition of step (b)(1) for any further nodes in a subtree for which the one node is a root node of the subtree, if said probability is less than the respective minimum probability value of one of the levels.

10. A method, according to claim 8, of indexing and searching a plurality of electronic handwritten documents, further comprising the steps of:
  (d) providing a set of T input symbols;
  (e) selecting one of the sequences of pointers that corresponds to the T input symbols;
  (f) identifying the subset of the plurality of documents in the list of the leaf node to which the selected sequence of pointers leads as being found by the search, wherein steps (d) through (f) are initiated after steps (a) through (c) are completed, and no recognition operations are executed while performing steps (d) through (f).

11. A method according to claim 10, wherein step (e) further comprises the steps of:
  (g) selecting the one of said nodes that is in the first level;
  (h) repeating, for each value of j between zero and T–1, the steps of:
    (1) identifying a respective index $k_j$ for the j$^{th}$ input symbol, where $k_j$ is an integer between zero and n–1, such that the $k_j^{th}$ output symbol of the selected node matches the j$^{th}$ input symbol, and
    (2) selecting the node in the j+1$^{th}$ level to which the $k_j^{th}$ pointer of the node selected in step (l) (1) points.

12. A method for indexing a plurality of electronic handwritten documents, each of which includes a plurality of output symbols ordered in an output sequence, each document being modeled by a respective Hidden Markov Model (HMM), the Hidden Markov Models having a common alphabet including n output symbols, and a common output sequence length of T symbols, where n and T are integers, the method comprising the steps of:
  (a) establishing an index of symbols without translating the symbols into one of a known character and a known pictograph, each symbol being a feature vector, the index comprising T+1 levels of linked nodes stored in a memory, the levels ordinally numbered zero$^{th}$ through T$^{th}$, the zero$^{th}$ level being a root node, each node in the T$^{th}$ level being a leaf node, each level between zero and T–1 having a respectively different minimum probability value and, each node between the zero$^{th}$ level and the T–1$^{th}$ level having n pointers, each being associated with a respectively different symbol in the alphabet and identifying a respectively different node in a next level of the index, the pointers between the zero$^{th}$ and T–1$^{th}$ levels forming sequences of pointers that represent sequences of output symbols, each sequence of pointers leading from the root node to a respectively different one of the leaf nodes, each leaf node being associated with a respectively different sequence of output symbols;
  (b) executing a procedure that comprises the steps of:
    (1) performing, for each one of a subset of the nodes in one of the levels, the steps of:
      (i) determining a probability that one of the pointers within one of the sequences of pointers leading from the root node to that node represents the output symbol at that level in one of the documents,
      (ii) executing the procedure for a node in a next level, if the probability determined in step (b)(1)(i) exceeds the minimum probability value of the one level and the next level is between the one$^{th}$ level and the T–1$^{th}$ level, and (c) repeating step (b), for each of the plurality of documents other than the one document.

18. A method for indexing and searching a plurality of electronic handwritten documents, each of which includes a plurality of output symbols and is modeled by a respective Hidden Markov Model (HMM), the Hidden Markov Models having a common alphabet including n symbols, and a common output sequence length of T symbols, where n and T are integers, the method comprising the steps of:

(a) establishing an index of symbols without translating the symbols into one of a known character and a known pictograph, each symbol being a feature vector, the index comprising T+1 levels of linked nodes stored in a memory, the levels ordinally numbered zero$^{th}$ through T$^{th}$, each node between the zero$^{th}$ level and the T−1$^{th}$ level having n pointers, each pointer identifying a respectively different subtree of the respective node, each node in the T$^{th}$ level having a respective list of pointers identifying respective documents;

(b) establishing a respective threshold value for each level;

(c) calculating a probability that the HMM for one of the documents identifies the k$^{th}$ symbol of the alphabet as being representative of the j$^{th}$ output symbol of the one document, where k is an integer between zero and n−1, and j is an integer between zero and T−1;

(d) setting the k$^{th}$ pointer of one of the nodes in the j$^{th}$ level to point to one of the subtrees of the one node if the probability calculated in step (c) is greater than the threshold value of the j$^{th}$ level, the one subtree including a subset of the nodes in the T$^{th}$ level;

(e) incrementing j by one;

(f) repeating steps (c) through (e) for each level j while: (1) j is less than T, and (2) the probability calculated in step (c) is greater than the threshold value of the j$^{th}$ level, thereby forming a sequence of pointers;

(g) repeating steps (c) through (f) for each value of k;

(h) identifying the one document in one of the lists in the T$^{th}$ level, if the probability of the sequence of pointers identifying each of the output symbols in the one document ordinally numbered one$^{th}$ through T−1$^{th}$ is greater than the threshold value of the T$^{th}$ level;

(i) repeating steps (c) through (g) for each one of the plurality of documents;

(j) providing a set of T input symbols;

(k) selecting the one of said nodes that is in the first level;

(l) repeating, for each value of j between zero and T−1, the steps of:

(1) identifying a respective index k$_j$ for the j$^{th}$ input symbol, where k$_j$ is an integer between zero and n−1, such that the k$_j^{th}$ output symbol of the selected node matches the j$^{th}$ input symbol, and (2) selecting the node in the j+1$^{th}$ level to which the k$_j^{th}$ pointer of the node selected in step (l)(1) points; and (m) selecting the subset of the plurality of documents to which the selected node in the T$^{th}$ level points as being found by the search, wherein steps (c) through (g) are completed for all documents prior to initiating any of steps (j) through (m).

19. Apparatus for indexing and querying a plurality of electronic handwritten documents, each of which includes a plurality of output symbols, the apparatus comprising:

an index formed by modeling each of the electronic handwritten documents by a respective Hidden Markov Model (HMM), the Hidden Markov Models having a common alphabet including n symbols, and a common output sequence length of T symbols, where n and T are integers, which includes:

a plurality of nodes arranged in T levels, said plurality of nodes including a root node at a zeroth level and a plurality of leaf nodes, a plurality of paths from the root node to respectively different ones of the plurality of leaf nodes, each path defining a respectively different sequence of feature vectors which has at least a minimum probability of occurring in at least one of said documents, each of said leaf nodes storing at least one pointer which points to the one of said plurality of electronic handwritten documents having said minimum probability, each of said leaf nodes having the capacity to store a plurality of pointers;

a plurality of stored electronic handwritten documents, each pointed to by at least one of said pointers stored in said leaf nodes;

means for receiving an entered input sequence;

means for selecting the one of the plurality of paths that corresponds to the received input sequence without interpreting what the input sequence or the symbols in the input sequence represent; and means for traversing the selected path of the index based and for identifying all documents pointed to by one of said leaf nodes if said input sequence corresponds to a path from the root node said one leaf node, wherein said means for receiving, said means for selecting, and said means for traversing operate without translating the input sequence into a fixed character set.

* * * * *